May 31, 1966 F. J. McENTEE, JR 3,253,650
HEAT-EXCHANGE APPARATUS
Filed July 11, 1960 5 Sheets-Sheet 2
FIG. 6
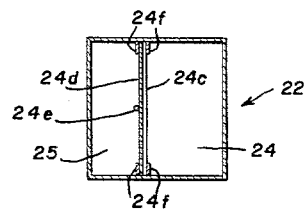
FIG. 5
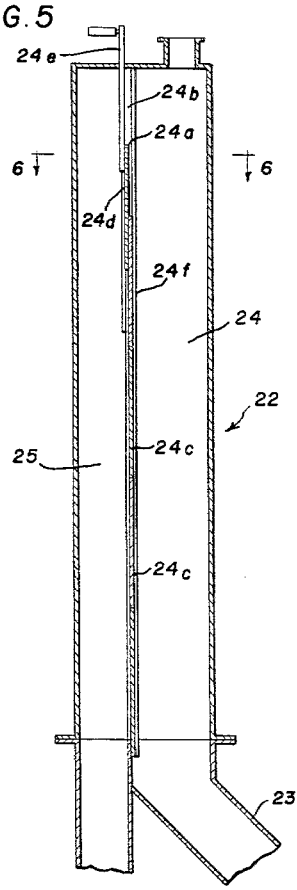
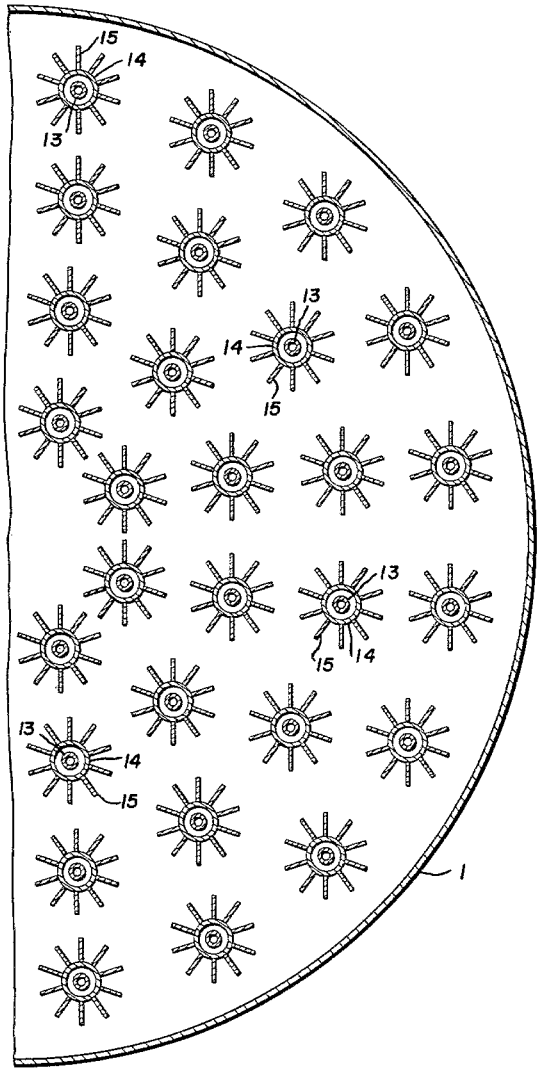
FIG. 2
FIG. 10
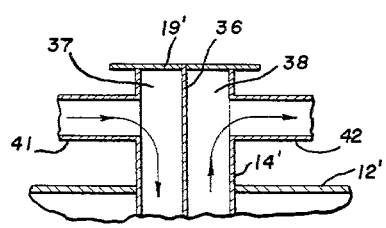
INVENTOR.
FRANK J. McENTEE JR.
BY
ATTORNEYS INVENTOR.
FRANK J. McENTEE JR.

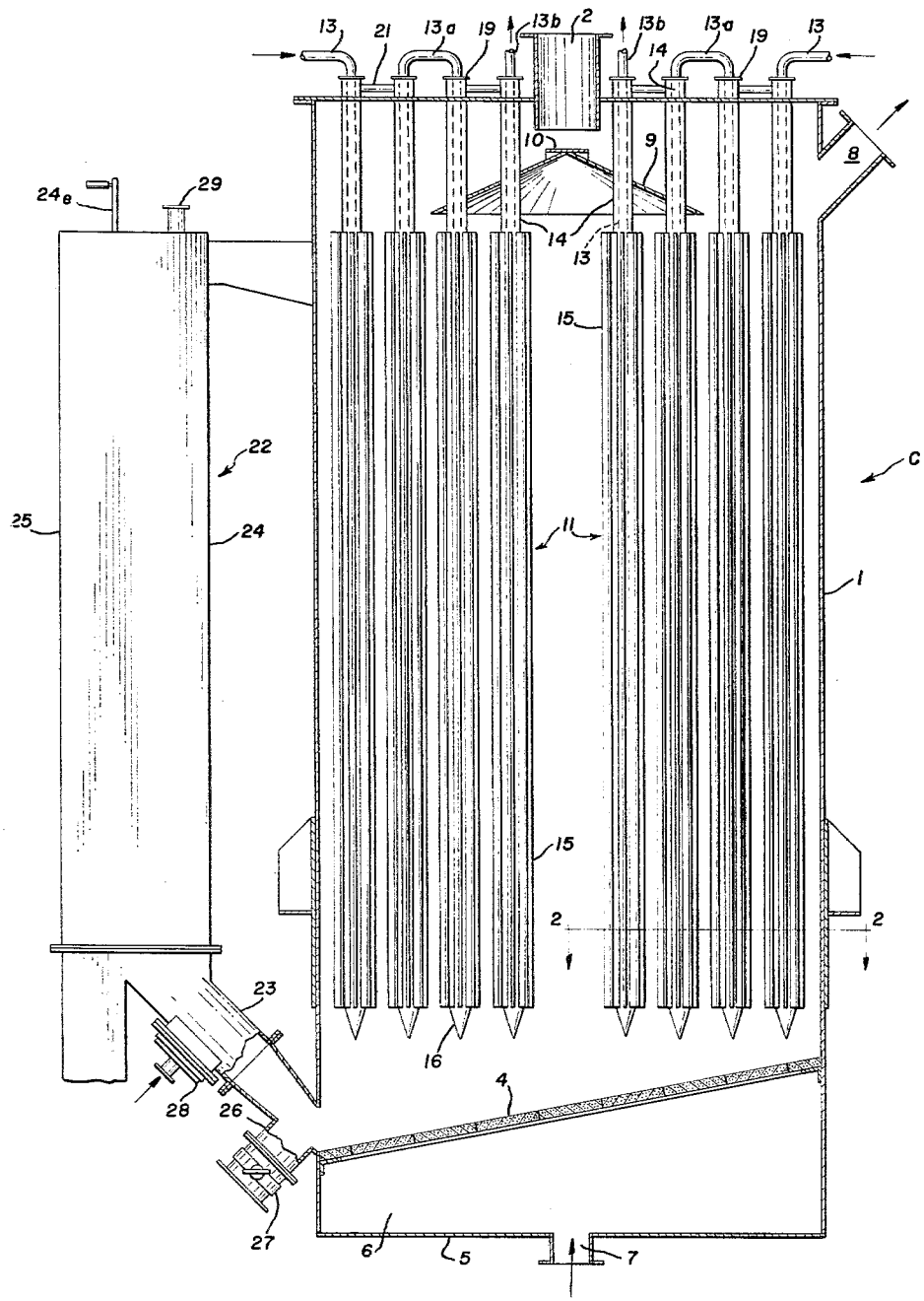
FIG. I
INVENTOR.
FRANK J. McENTEE JR.

BY

ATTORNEYS

May 31, 1966   F. J. McENTEE, JR   3,253,650
HEAT-EXCHANGE APPARATUS
Filed July 11, 1960   5 Sheets-Sheet 5

*INVENTOR.*
FRANK J. McENTEE JR.
BY
ATTORNEYS

United States Patent Office 3,253,650
Patented May 31, 1966

3,253,650
HEAT-EXCHANGE APPARATUS
Frank J. McEntee, Jr., 1106 N. Hillcrest Road,
Beverly Hills, Calif.
Filed July 11, 1960, Ser. No. 41,967
8 Claims. (Cl. 165—120)

This application is a continuation-in-part of my application Serial No. 628,637, filed December 17, 1956, now Patent No. 2,953,365, granted September 20, 1960.

The present invention relates to heat exchange with pulverulent or granular materials, and is more particularly concerned with the cooling of such materials in fluidized beds.

The heating and cooling of pulverulent or granular materials in fluidized beds has been complicated by several problems including short-circuiting of hot material through the cooler to the outlet or discharge; uneven or erratic fluidization because of interference or obstruction of the fluidizing air flow by heat exchange surfaces or elements embedded in the fluidized bed; blockages caused by accumulations of oversize materials; and coating of the material on the heat-exchange surfaces.

Prior fluidized heat exchangers have employed arrangements and combinations of overflow and underflow weirs within horizontally elongated chambers, vertically elongated chambers, and various types of heat exchange surfaces such as hollow tubes. However, none of the prior arrangements has been found entirely satisfactory.

The present invention provides an apparatus for heat exchange in a fluidized bed in which the heat-transfer surfaces are maintained in a clean, uncoated condition by the motion of the material therealong, which may be regulated to compensate for variations in operating conditions.

In general, the preferred form of apparatus of the present invention comprises an elongated, preferably upright casing having a material inlet and a material outlet spaced from each other a substantial distance. The material with respect to which heat transfer is to be effected is maintained in a fluidized state in the casing. Between the inlet and the outlet, and in the space occupied by the fluidized material, the casing is provided with a plurality of heat-transfer members having extensive heat-transfer surfaces, such as fins. The heat-transfer members occupy a large portion of the volume and cross-sectional area of the casing, and extend substantially longitudinally between the inlet and outlet. Means are provided for maintaining a relatively high velocity of the material along the heat-transfer surfaces to prevent coating or build-up of material thereon.

A better understanding of the invention may be derived from the accompanying drawings and description in which:

FIG. 1 is a vertical sectional view of a fluidized cooler embodying the preferred form of the invention;

FIG. 2 is an enlarged horizontal sectional view of a portion of the cooler, taken along lines 2—2 of FIG. 1;

FIG. 5 is a vertical sectional view of the discharge conduit of the fluidized cooler of FIG. 1;

FIG. 6 is a horizontal sectional view taken on line 6—6 of FIG. 5;

FIG. 10 is a vertical sectional view of the upper end of the heat-transfer member of FIG. 8 and its associated parts;

Figure 11:
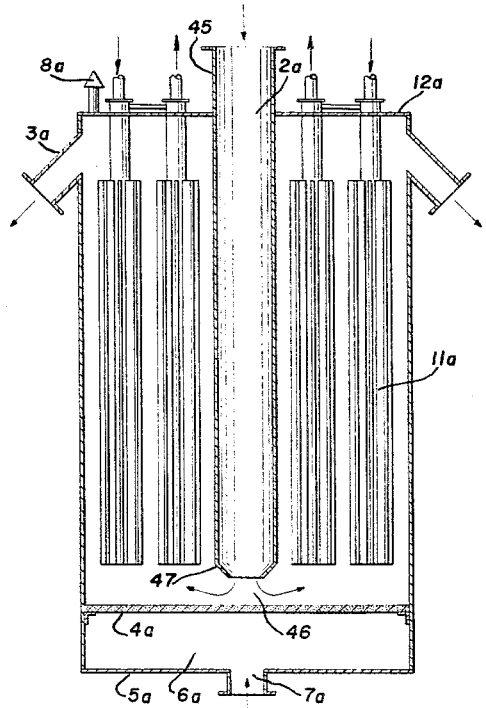
FIG. 11 is a vertical sectional view of a modified form of a cooler embodying the invention.

As shown in FIGS. 1 to 7, the preferred form of the invention, as embodied in a fluidized cooler for hydraulic cement, comprises a cooler C in closed circuit with an air-swept finish mill M and an air-swept separator S. It is to be understood that any type mill or separator may be used in the circuit. The fluidized cooler comprises a vertically elongated vessel or casing 1 which may be of any suitable cross-sectional shape, and which is shown here in the preferred form of a cylinder. The casing 1 has a material inlet 2 at its upper end and a material outlet 3 in its lower region. Adjacent the material outlet 3 is a gas-permeable deck 4 which forms a floor in the casing and slopes downwardly towards the outlet. The gas-permeable deck preferably is formed of filter stones or similar heat-resistant material or, if temperature permits, may comprise a tightly woven fabric. The permeability of the deck is preferably as uniform as possible throughout its full area. The deck 4 is spaced from the bottom wall 5 of the casing to provide a plenum chamber 6 therebetween. An air or gas inlet 7 is provided in the bottom wall 5 for introducing fluidizing air or gas under pressure into the plenum chamber 6 to pass upwardly through the gas-permeable deck 4 to fluidize overlying material. Air separating from the upper surface of the material is discharged through a vent 8 in the upper region of the casing.

A distributing cone 9 is arranged beneath the inlet 2 to spread and to form the incoming hot material into an annular, downwardly-flowing stream. Air rising beneath the distributor 9 passes outwardly through and agitates the annular stream of material as it falls off the outer edge of the distributor and onto the bed of material in the vessel. A disc 10 at the apex of the distributor 9 slightly chokes or retards the flow of material through the inlet 2 and aids in distributing the material.

A plurality of heat-transfer members extend downwardly from the top wall 12 of the casing in a substantially symmetrical arrangement, preferably in concentric series arrangement, with respect to the cross-sectional area of the casing and in a number sufficient to provide a relatively small cross-sectional area open between the heat-transfer member for flow of material through the casing. Each heat-transfer member 11 includes a pair of concentrically arranged inner and outer pipes 13 and 14 (FIGS. 3 and 4) respectively, both of which extend through the top wall 12. The outer pipe 14 is provided with a plurality of outwardly-extending, radial, heat-conducting fins 15. The fins 15 extend vertically of the pipe 14 from its lower end to a position slightly below the top wall 12 of the vessel 1. A closure member 16 in the form of a downwardly-pointing cone is provided for the lower end of each outer pipe 14. The cone 16 serves to distribute the air flow evenly around the surface of the members 11 to prevent short-circuiting of portions of the air along one side of the members.

Figure 4:
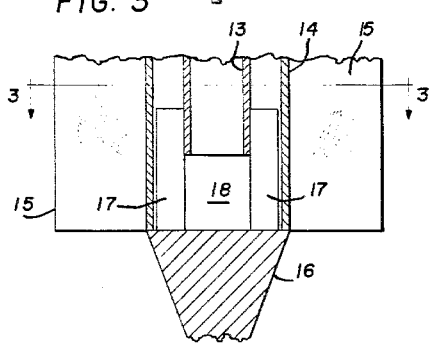
FIG. 4 is a vertical sectional view of the lower portion of one of the heat-exchange members, taken on line 4—4 of FIG. 3.

The inner pipes 13 of the heat-transfer members 11 terminate short of the lower ends of the outer pipes 14 and are provided with a pair of legs 17, as best seen in FIG. 4, which maintains a gap 18 between the lower end of the inner pipe 13 and the upper portion of the closure cone 16. The legs 17 also function as spacers to maintain the concentric relationship between the inner and outer pipes 13 and 14. At their upper ends, the inner pipes 13 extend through end walls or caps 19 of the outer pipes 14 to provide means for the introduction of a heat-exchange medium.

The lower ends of the heat-transfer members 11 may be secured in proper spaced position with respect to one another by suitable bracing, if desired.

The various heat-transfer members may be connected in series or in parallel, as desired, for the flow of heat-transfer medium through them. As shown in FIG. 1, the heat-transfer members are connected together in groups to provide series flow of the heat-transfer medium through each group of the members. To this end, the outer pipes 14 of adjacent pairs of heat-transfer members are connected by pipes 21, and the inner pipes 13 of the adjacent members of adjacent pairs are connected to each other by an inverted U-shaped section 13a. With the pipes thus connected, heat-exchange medium supplied through the inlet pipes 13 will first pass downwardly through the inner pipes to the bottom of the heat-exchangers to which the pipes are connected and through the gap 18 into the outer pipes 14. The heat-exchange medium then flows upwardly through the outer pipes and is discharged through the connections 21 into the outer pipe 14 of a second heat exchanger. In the second heat exchanger, it flows downwardly through the outer pipe 14 and upwardly through the inner pipe to be discharged at the upper end thereof into one of the inverted U-shaped sections 13 from which it passes to the inner pipe of a third heat exchanger. This series flow continues until the heat-exchange medium is discharged through the pipe 13b.

The material outlet 3 communicates with the lower end of a discharge conduit 22. The discharge conduit includes a lower leg 23 extending outwardly and upwardly from the outlet 3 to the lower end of a vertically-extending leg 24 which discharges at its upper end into an overflow leg 25. The vertical leg 24 and the overflow leg 25 may be separate conduits, or, as shown in FIGS. 5 and 6, may be compartments of a single discharge conduit 22.

The level of the overflow from the vertical leg 24 into the overflow leg 25 will determine the level of the material in the vessel 1, but due to wall friction in the vertical leg 24, the level of the material in the vessel 1 may be somewhat above the level of the overflow edge 24a of the opening 24b from the vertical leg 24 into the overflow leg 25.

It sometimes is found desirable to alter the level of the overflow edge 24a to correspondingly alter the level of the material in the vessel 1. To this end, the common wall between the vertical leg 24 and the discharge leg 25 comprises a series of replaceable or removable loose plates 24c and a sliding plate or weir 24d having the overflow edge 24a which may be adjusted vertically by a handle 24e. The handle 24e may be held in its adjusted position by any suitable means. The plates 24c and the plate or weir 24d are held in place by guides 24f secured to the inside of opposite walls of the conduit. By removing or adding plates 24c or by replacing larger plates with smaller plates or vice versa and by the use of the sliding plate or weir 24d, the overflow edge 24a may be positioned at any desired level.

Instead of the means just described for adjusting the level of the overflow edge 24a, any other means may be provided for raising or lowering of such edge.

Adjacent the material outlet 3, the lower leg 23 of the discharge conduit 22 is provided with a sump 26 which is open to the interior of the leg 23, and is closed to the atmosphere by a valve 27. The valve 27 may be opened periodically to drain off accumulations of oversize material, lumps, or foreign objects.

Adjacent the leg 24, the lower wall of the lower leg 23 is provided with an aerator 28 which underlies the vertical leg 24 to deliver aerating air upwardly therethrough. The air passing upwardly through the conduit 22 escapes through a suitable vent 29 in the upper end thereof.

Figure 7:
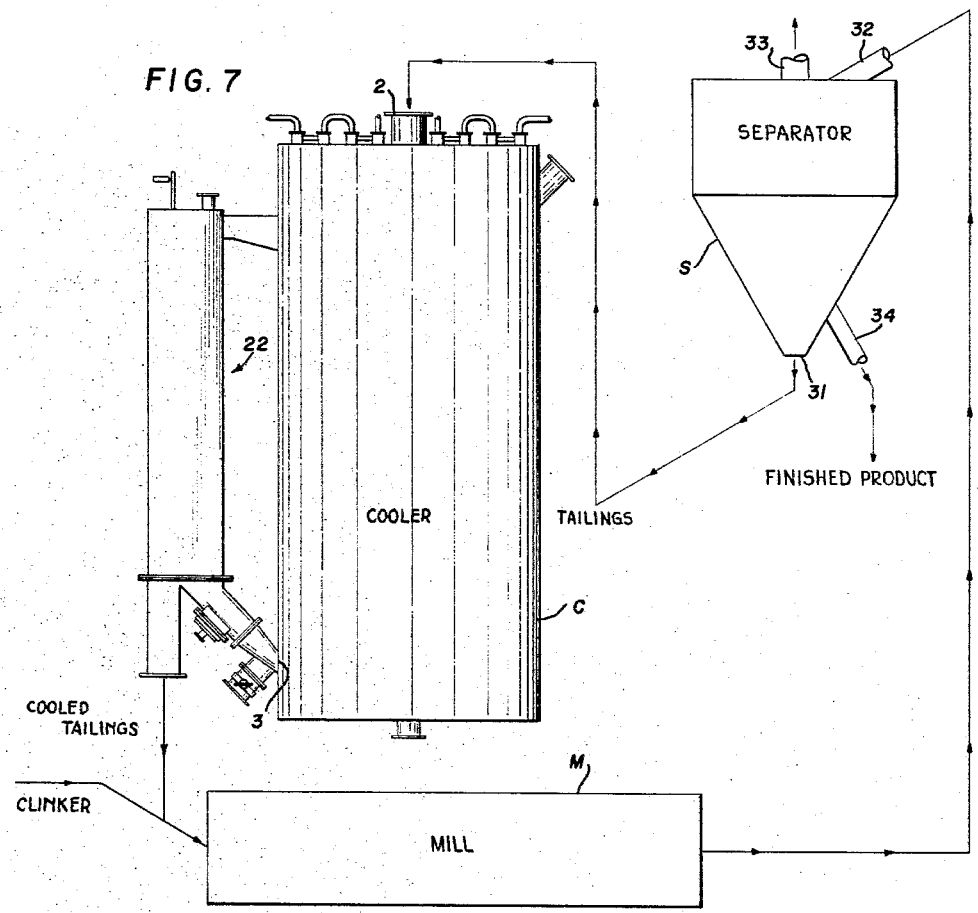
FIG. 7 is a schematic view of a preferred installation embodying the cooler.

As best shown in FIG. 7, the cooler C receives material through its inlet 2 from the coarse tailings outlet 31 of the air-swept separator S, and discharges the tailings after being cooled through its outlet 3 and discharge conduit 22 to the inlet of the air-swept mill M, such as a cement finish mill.

The material discharged from the mill is passed to the inlet 32 of the separator S. Under the influence of an air impeller (not shown), which may be an integral part of the separator, the separator classifies the material into coarse and fine fractions and discharges the air through an air outlet 33; the coarse tailings through the outlet 31, and the desired fine fraction of finished product through a product outlet 34. Where desired, the finished cement product discharged through the outlet 34 may be passed to a second cooler prior to use or storage.

In operation of the apparatus of FIGS. 1 to 8 for the cooling of hydraulic cement, the mill M, separator S and the fluidizing air-flow to the cooler C are started and a feed of cement clinker is delivered to the mill from storage or from a primary clinker crusher (not shown) for grinding. The grinding of the cement clinker develops considerable heat which subsequently must be removed. It is generally accepted theory that the greater portion of the horsepower supplied to a mill of the type commonly used for finished grinding of cement is lost in the form of heat developed by abrasion and impact.

The hot cement passes from the discharge end of the mill M to the separator S and from the separator to the cooler C. This operation is continued until the temperature of the material in the cooler is above the dew point of the fluidizing air in order to avoid condensation of moisture on the surface of the heat-transfer members 11. When this condition is reached, the flow of the cooling medium, preferably water, through the heat-transfer members 11 is started.

The hot tailings which leave the separator at a temperature of the order of 150° F. to 300° F., for example, pass through the inlet 2 of the cooler and onto the disc 10. The free flow of the hot tailings in the cooler is checked by the disc 10, which prevents any uneven flow, or excessive flow along one side of the inlet pipe from continuing within the cooler. The material feeds off the edge of the disc 10 and beneath the circular lower edge of the inlet 2 as an annular stream onto the distributing cone 9, and from the lower edge of the distributing cone downwardly onto the main body of fluidized cement in the cooler.

The cement which exhibits pseudo-hydrostatic properties similar to those of a liquid tends to seek an equilibrium point, or in other words, a constant level. Therefore, a portion of the fluidized bed will flow through the outlet 3 and upwardly into the vertical leg 24 of the discharge conduit. The air supply to the aerator 28 is regulated to cause fluidization of the material thereabove in the leg 24 to an extent to produce a lower density of the fluidized mass therein such that the head or hydrostatic pressure of the fluidized mass in the vessel will cause the less dense fluidized material at the leg 24 to rise and to overflow into the leg 25 from which it is discharged.

In normal operation, as long as the supply of air to the aerator is continued, cement is discharged from the bed. Therefore, the new cement distributed by the cone onto the upper surface of the fluidized bed is fluidized and mixed with the bed and passes downwardly in the vessel 1 as a part of the fluidized bed. As the cement passes downwardly through the cooler, the constant agitation of the cement resulting from the fluidization of the bed causes an efficient heat transfer between the cement and the heat-transfer members 11, since the individual particles of the cement are caused to contact different areas of the heat-transfer members. Preferably the rate of cement fed to the casing 1 is so correlated with the rate at which the cement is discharged through the outlet 3 that the flow of the fluidized cement through the cooler is maintained at a velocity of about three feet per minute. For materials which are moisture-sensitive and which tend to coat on the heat-transfer surfaces, velocities down to about one foot per minute may be satisfactory. However, in some instances even higher or lower velocities may be satisfactory.

Although it is to be understood that the cooler of the present invention is equipped for use in different circuits, such as a direct cooling of the finished cement product, closed circuit cooling of the mill discharge enroute to the separator or of the tailings from the separator while they are enroute back to the mill is preferred in many cases. When the cooler is located in either of these positions, within a closed circuit, it receives a substantial material flow, commonly called the "circulating load," which may be, in terms of weight per hour, from one to eight times the output of finished product from the mill circuit. This substantial load of material makes possible a relatively high velocity of material flow along the heat-transfer surfaces, particularly since the number and size of the heat-transfer members restrict the area within the casing through which the materials may flow. Nevertheless, a large bulk of cooled material is maintained in the circuit, within which bulk the heat developed in the mill may be distributed and dissipated.

When operating in a closed circuit and it is desired to change the particle size of the feed to the mill, say from one-fourth inch to three-eighths inch or one-half inch, there will be a higher proportion of rejects from the separator to be passed to the cooler. Under such conditions, if the level of the overflow edge 24a remains the same, there will be a gradual building up of the amount of the material in the cooler, which, if not corrected, may result in a condition in which the entire system will become plugged. To avoid this, the overflow edge 24a will be lowered to the extent necessary to maintain the desired level of the fluidized material in the vessel 1.

In the production of hydraulic cement, the desired cooling result is expressed in terms of the temperature of the finished cement. Since the amount of heat produced by a mill is relatively constant for a given rate of output of finished cement, the high circulating load of partially-cooled material being returned to the mill inlet causes the total heat input of the mill to be distributed over a large mass of material, thereby causing a lower actual rise in temperature of that material than would occur with a lesser mass of returned or recycled material. Therefore, when the cooler of the present invention is employed in either of the preferred locations in the circuit, it is not necessary to cool the large circulating load to a very low temperature, since only the extraction of total heat therefrom, in terms of B.t.u.'s, is required to provide for absorption of the mill heat by the large mass. Thus a lower temperature differential may be maintained between the material and the cooling medium while still producing the required result. At the same time, reduction of the temperature of the material in the mill prevents coating of the balls or other grinding media by the material and, in the case of hydraulic cement, prevents the false setting found in overheated material.

Figure 8:
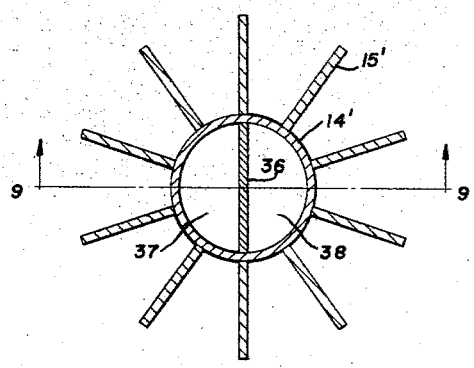
FIG. 8 is a cross-sectional view of the lower end of a modified form of heat-transfer member.
Figure 9:
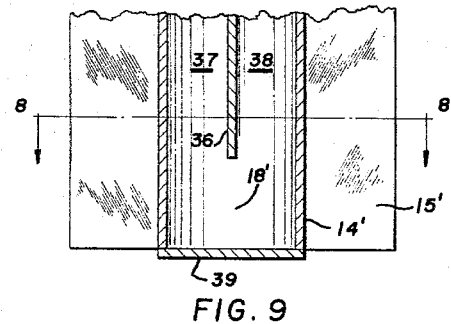
FIG. 9 is a vertical sectional view taken on the lines 9—9 of FIG. 8.

The modified form of heat-transfer member shown in FIGS. 8 to 10 comprises only a single pipe 14' having longitudinal and radially-extending heat-conducting fins 15' on its outer surface. A transverse partition 36 divides the interior of the pipe 14' into a pair of channels 37 and 38 and extends from the top endwall or cap 19' of the pipe (FIG. 10) to a point spaced from the lower endwall 39 (FIG. 9) to form a gap 18' therebetween for the flow of the heat-transfer medium. At its upper end above the top wall 12' of the casing, the pipe 14' is connected to an inlet pipe 41 communicating with the channel 37 and an outlet pipe 42 communicating with the channel 38. The heat-transfer members 14' may be operated in parallel, or may be connected to operate in series arrangement.

In operation, cooling fluid is delivered through the inlet pipe 41 into the channel 37 and passes downwardly therethrough to its lower end. The cooling fluid then passes through the gap 18' beneath the partition 36 and upwardly through the channel 38 to the outlet pipe 42.

The modified form of cooler shown in FIG. 11 comprises a casing 1a having a material inlet 2a in its top wall 12a and a material outlet 3a located at opposite sides. A gas-permeable deck 4a extends across the lower region of the casing and, together with the bottom wall 5a of the casing, forms a plenum chamber 6a. Air or gas is supplied to the plenum chamber via a gas inlet 7a to pass upwardly through the gas-permeable deck 4a to fluidize pulverulent material in the casing. A suitable vent 8a extending from the top will 12a discharges the gas escaping from the fluidized material from the casing. A plurality of heat-transfer members 11a are arranged within the casing in an arrangement similar to those of FIG. 1

A material-inlet pipe or tube 45 extends downwardly from the material inlet, and at its lower end terminates at a point spaced from the gas permeable deck 4a to form an annular distributing orifice 46 through which the material is discharged into the casing. The lower end of the tube 45 is constricted by an inverted frusto-conical section 47 which chokes or restricts material within the pipe to facilitate uniform feeding thereof outwardly through the annular orifice 46 into the casing.

In operation of the apparatus of FIG. 11, the flow of fluidizing gas upwardly through the gas-permeable deck 4a is started. The flow of cooling fluid through the heat-transfer members 11a is started either before or after starting the flow of material through the casing, as desired.

The material passing downwardly through the inlet tube 45 is partially retarded by the restricting frusto-conical section 47, thereby stabilizing the material flow and preventing any short-circuiting along a side of the tube. The material is thereby metered through the annular orifice 46 into the free space within the casing. The material in the casing is fluidized and, as additional material is fed to the casing, is displaced upwardly along the heat-transfer members 11a until it ultimately overflows through the material outlets 3a and is discharged from the casing.

Figure 12:
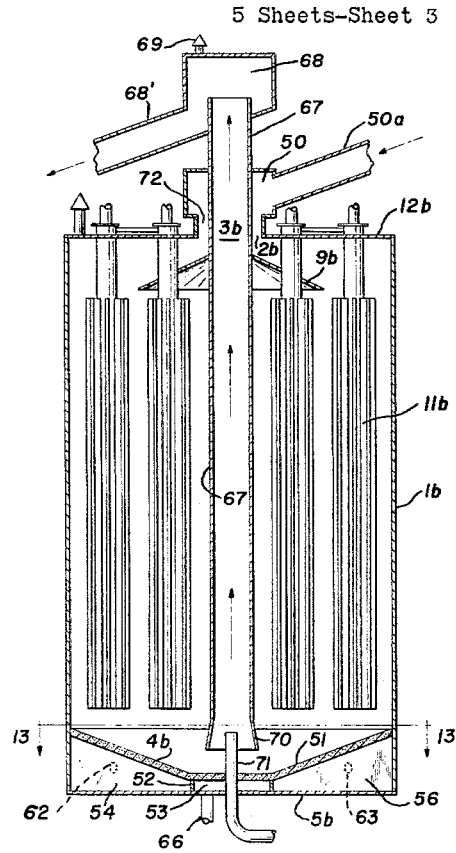
FIG. 12 is a vertical sectional view of a further modified form of cooler embodying the invention.
Figure 3:
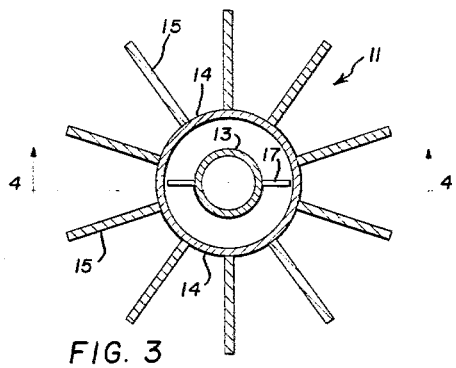
FIG. 3 is an enlarged horizontal cross-sectional view of a heat-exchange member.
Figure 13:
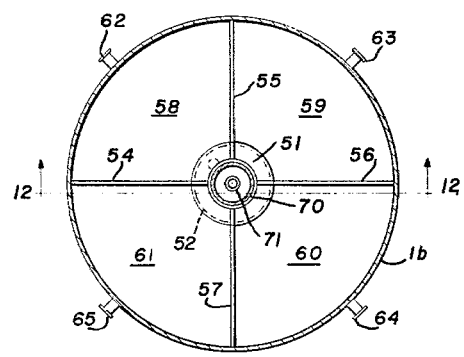
FIG. 13 is a horizontal sectional view taken on lines 13—13 of FIG. 12.

The modified form of cooler shown in FIGS. 12 and 13 comprises a casing 1b having a material inlet 2b and a material outlet 3b and a plurality of heat-transfer members 11b similar to those of FIGS. 1 and 11. A material inlet chamber 50 mounted on the top wall 12b communicates with the inlet 2b, through a collar or neck element 50'. Material to be introduced to the casing is fed to the inlet chamber through a pipe 50a. A gas-permeable deck 4b extends across the lower portion of the casing and is spaced from the bottom wall 5b thereof to form a series of plenum chambers, as hereinafter described.

The gas-permeable deck slopes downwardly from adjacent the periphery of the casing to a lower level 51 adjacent the center of the casing. A circular wall 52 closes the space between the bottom wall 5b and the underside of the lower level 51 of the deck to form a central plenum chamber 53. Four radially-extending walls 54, 55, 56 and 57 divide the space between the gas-permeable deck 4b and the bottom wall of the casing and surrounding the central plenum chamber 53 into four quadrants or outer plenum chambers 58, 59, 60 and 61 of sector shape. The outer plenum chambers are provided with individual gas inlets 62, 63, 64 and 65, respectively, and the central plenum chamber 53 is provided with a separate gas inlet 66.

A gas-lift pipe 67 extends upwardly from a position above and spaced from the lower area 51 of the gas-permeable decks 4b, through a distributing cone 9b positioned beneath the material inlet 2b, the inlet chamber 50 and into a separating chamber 68 having an air vent 69. The lower end of the gas-lift pipe 67 is flared outwardly to form a frusto-conical section 70 which receives the discharge end of a nozzle pipe 71. The construction of the gas-lift pipe and nozzle is the subject of Patent No. 2,509,983 to Joseph H. Morrow. A discharge pipe 68' extends from the chamber 68 for the discharge of material fed thereto through the gas-lift pipe 67.

At the point at which it passes through the material inlet 2b, the gas-lift pipe 67 and the collar or neck 50' form an annular space 72 through which material is fed from the inlet chamber 50 onto the distributing cone 9b.

In operation of the apparatus of FIGS. 12 and 13, a flow of fluidizing gas upwardly through the gas-permeable deck is started and maintained as described more fully hereinafter. The flow of cooling fluid through the heat-transfer member 11b is started either before or after starting the flow of material through the casing, as desired.

The flow of material into the inlet chamber 50 is partially retarded by the size of the annular aperture 72 and by the cone 9b, thereby stabilizing the material flow and preventing short-circuiting of the material along one side of either the aperture 72 or the casing. The material passes as an annular stream through the annular aperture 72, and is thereafter evenly distributed by the cone 9b over the upper surface of the bed of fluidized material in the casing.

Air or gas is delivered through the central plenum chamber 53 and the lower deck area 51 and through the nozzle pipe 71. The material above the lower deck area 51 is fluidized by the air passing upwardly therethrough and rises in the gas-lift pipe 67 where it tends to seek in equilibrium point or stable level. The air entering the lift pipe 67 from the nozzle 71 further aerates, expands and reduces the density of this material in the lift pipe. The "head" of the material bed in the casing around the gas-lift pipe forces additional material into the lower end of the lift pipe and causes the less dense material therein to move upward into the separating chamber 68. In the separating chamber 68 the air separates from the pulverulent material and escapes through the vent 69, while the material is discharged by gravity or by other means through the discharge pipe 68'.

Assuming a substantially constant feed of material into the upper end of the vessel 1b, the level of the material within the vessel can be controlled by the amount of gas introduced through the nozzle pipe 71. Increasing the amount of gas introduced through the nozzle pipe 71 into the lift pipe lowers the density of the fluidized material in the lift pipe and increases the density differential between the fluidized material in the gas-lift pipe and in the main vessel surrounding the lift pipe. This results in a greater flow of material upwardly through the lift pipe and a corresponding lowering of the level of the material in the vessel. In a similar manner, a reduction of the amount of air introduced through the nozzle pipe 71 will result in an increased density of the fluidized material in the lift pipe and a decrease in the density differential between the fluidized material in the gas-lift pipe and in the vessel surrounding it. This will result in a lesser flow of the fluidized material upwardly through the gas-lift pipe and a corresponding raising of the level of the fluidized material in the vessel.

The rate of air flow, or the amount of air or gas per minute per square foot of the gas-permeable deck in each of the sectors 58, 59, 60 and 61 may be regulated by suitable valving (not shown) to control the rate of flow through the gas inlets 62, 63, 64 and 65, respectively. The rate of flow through each of the sectors may be equal, or may be consistently non-uniform, with the higher air flow being cycled or periodically shifted to different sectors as more fully described in Patent No. 2,844,361, issued July 22, 1958, to Dilcher et al.

This control over the aeration of different zones of the material bed permits regulation of material density and material velocity in the various zones. Therefore, when problems such as a local zone of dense or agglomerated material occur, the air flow may be temporarily set to create a high state of material turbulence, or a high material velocity in the desired zone. Although the temporary turbulence or high velocity may not be the most efficient in terms of heat transfer, it may be used for periodic clearing of the heat-transfer members or breakdown of dense material areas. After the heat-transfer members of one section have been cleared by high aeration, that section may be returned to the rate of air flow desired for effective heat transfer, and another sector may receive the higher air flow.

Figure 14:
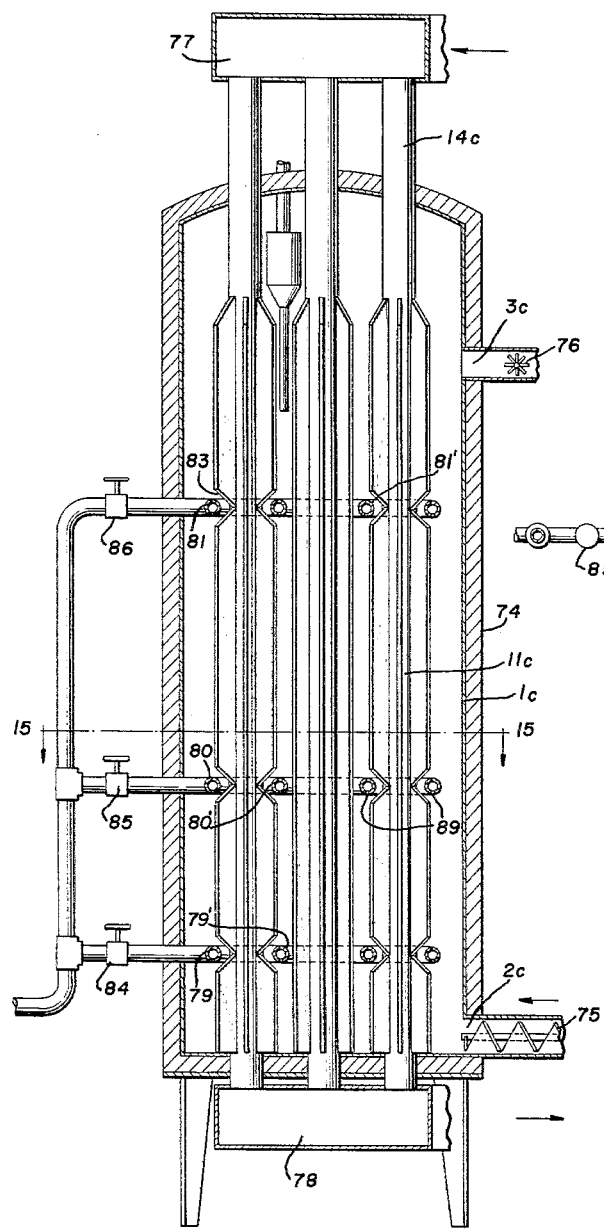
FIG. 14 is a vertical sectional view of a modified form of cooler embodying the invention using a gaseous heat-transfer fluid.
Figure 15:
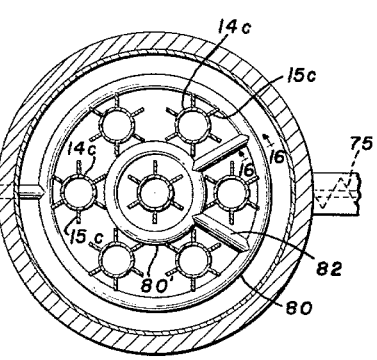
FIG. 15 is a horizontal sectional view taken along lines 15—15 of FIG. 14.
Figure 16:
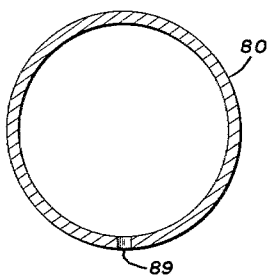
FIG. 16 is an enlarged view of a portion of one of the aerating pipes of FIG. 15.

As shown in FIGS. 14 to 16, a modified embodiment of the invention, which is particularly advantageous for use with a gaseous heat-transfer medium, comprises a casing 1c having a material inlet 2c in its lower region and a material outlet 3c in its upper region. A screw feeder 75 and a star feeder 76 control the flow of material through the inlet 2c and outlet 3c, respectively. When the unit is to be used for cooling extremely hot pulverulent materials, or where desired for any reason, a layer of insulation 74 is provided about the casing.

A plurality of heat-transfer members 11c extend through the casing longitudinally thereof, and are commonly connected at their opposite ends to an upper supply chamber 77 and a lower collecting chamber 78. The heat transfer members 11c comprise open pipes 14c having a plurality of longitudinally-extending fins 15c extending radially from the surface of the pipe length which is within the casing. Alternatively, the heat-transfer members of the preceding figures may be used to advantage.

Three annular aeration pipes 79, 80 and 81, respectively, are positioned at different vertical zones or levels around the outer heat-transfer members. A corresponding group of inner annular aeration pipes 79', 80' and 81' are positioned adjacent the pipes 79, 80 and 81, respectively, and communicate therewith by means of interconnecting pipes 82. The aeration pipes are uniformly perforated with apertures 89 on their lower sides or in any suitable manner to deliver air or gas into the surrounding material. Preferably, the fins 15c are notched or interrupted as at 83 to permit positioning of the aeration pipes close to the heat-transfer pipes 14c.

The groups of aeration pipes 79, 80 and 81 receive air or gas individually through piping and valves 84, 85 and 86, respectively, from a source (not shown). The spent air or gas is vented from the casing by a cyclone vent 87 which removes stray dust from the gases and returns it to the material bed through a dip leg 88.

In operation of the apparatus of FIGS. 14 to 16, material is delivered into the casing by the screw feeder 75, and is ultimately removed at the top of the bed by the star feeder 76. Fluidizing air or gas is delivered through the apertures 89 of aerating pipes 79 to 81 and 79' to 81' to fluidize the material in the vessel, and escapes from the vessel through the cyclone vent 87. The rate of air introduction, and therefore the degree of fluidization at the different vertical zones, may be regulated by the valves 84, 85 and 86.

A gaseous heat transfer medium such as cold air is passed into the supply chamber 77 and through the heat-transfer members 11c and is withdrawn from the collecting chamber 78. Alternatively, if desired, the gaseous medium may follow an opposite path upwardly through the heat-transfer members. Also, liquid heat-exchange media may be used in the apparatus of FIGS. 14 to 16, if desired.

Various changes may be made in the details of construction of the several forms of heat-exchangers herein described without departing from the invention as defined in the subjoined claims or sacrificing any of the advantages thereof.

I claim:

1. Heat-exchange apparatus for treating pulverulent material comprising a vessel to receive the pulverulent material, the portion of the vessel which receives the material and in which the material is treated having an inlet adjacent one end of the vessel for the introduction of material to be treated and an outlet for treated material adjacent the other end thereof for the discharge of treated material, said discharge outlet including an upwardly-extending discharge conduit communicating with the discharge outlet, and means for introducing a gas into the lower portion of the upwardly-extending discharge conduit to facilitate flow of the pulverulent material discharged from the portion of the vessel in which it is treated upwardly through said conduit, said discharge conduit having a discharge outlet adjacent its upper end, at least a portion of the bottom of the vessel being gas-permeable, a plenum chamber located directly beneath said gas-permeable portion of the bottom of the vessel, said plenum chamber having an inlet for gas to flow thereinto and to pass therefrom upwardly through the gas-permeable portion of the bottom of the vessel and into overlying pulverulent material in the vessel to fluidize it, a plurality of heat exchangers within said vessel, said heat exchangers being spaced from the walls of the vessel and from one another to provide spaces for the material being treated, and means for causing a flow of heat-exchange medium through said heat exchangers.

2. Heat-exchange apparatus as set forth in claim 1, which includes means for adjusting the height of the overflow edge of the discharge outlet of said tube.

3. Heat-exchange apparatus as set forth in claim 2, in which the means for adjusting the height of said overflow edge includes a vertically-adjustable weir, and an upper edge portion of the weir forms the overflow edge of the discharge outlet of said tube.

4. Heat-exchange apparatus as set forth in claim 2, in which the means for adjusting the height of the overflow edge of the discharge outlet of said tube comprises a plurality of removable plates forming a portion of one side of said tube adjacent the overflow edge of the discharge outlet of said tube.

5. Heat-exchange apparatus as set forth in claim 1, in which the inlet to the vessel is through the top wall thereof and which includes a distributing member positioned below the inlet to cause incoming material to be spread out over a larger area of said vessel.

6. Heat-exchange apparatus as set forth in claim 5, in which the distributor is conical and is centrally positioned beneath said inlet tube.

7. Heat-exchange apparatus for treating pulverulent material comprising a vessel to receive the pulverulent material, the portion of the vessel which receives the material and in which the material is treated having an inlet adjacent one end of the vessel for the introduction of material to be treated and an outlet for treated material adjacent the other end thereof for the discharge of treated material, at least a portion of the bottom of the vessel being gas-permeable, a plenum chamber located directly beneath the gas-permeable portion of the bottom of the vessel, said plenum chamber having an inlet for gas to flow thereinto and to pass therefrom upwardly through the gas-permeable portion of the bottom of the vessel and into overlying pulverulent material in the vessel to fluidize it, a plurality of heat exchangers within said vessel, said heat exchangers being spaced from the walls of the vessel and from one another to provide spaces for the material being treated, each said heat exchanger comprising an outer tube and an inner tube within the outer tube, at least one end of the outer tube being closed, the inner tube extending into the outer tube and having an open end terminating at a distance spaced from said closed end of the outer tube, the outer tubes of certain of said heat exchangers being connected adjacent their ends remote from their said closed ends, the inner tubes of certain heat exchangers being connected at their ends remote from their said open ends, the connections between said outer tubes and said inner tubes being such as to provide for flow of heat-exchange medium introduced into one heat exchanger serially through a plurality of heat exchangers, and means for causing a flow of heat-exchange medium through said heat exchangers.

8. Heat-exchange apparatus for treating pulverulent material comprising a vessel to receive the pulverulent material, the portion of the vessel which receives the material and in which the material is treated having an inlet adjacent one end of the vessel for the introduction of material to be treated and an outlet for treated material adjacent the other end thereof for the discharge of treated material, at least a portion of the bottom of the vessel being gas-permeable, a plenum chamber located directly beneath the gas-permeable portion of the bottom of the vessel, said plenum chamber having an inlet for gas to flow thereinto and to pass therefrom upwardly through the gas-permeable portion of the bottom of the vessel and into overlying pulverulent material in the vessel to fluidize it, a plurality of heat exchangers within said vessel, said heat exchangers being spaced from the walls of the vessel and from one another to provide spaces for the material being treated, each said heat exchanger comprising a tube having at least one end closed, a partition extending across said tube and terminating at a distance from said closed end to provide a pair of communicating chambers in each tube, the ends of the tubes of certain of the heat exchangers remote from said closed ends being connected in such manner that a heat-exchange medium supplied to one chamber of one tube will flow serially through the respective chambers of said connected tubes, and means for causing a flow of heat-exchange medium through said heat exchangers.

References Cited by the Examiner

UNITED STATES PATENTS

| 929,144 | 7/1909 | Lesley et al. | |
| 1,012,487 | 12/1911 | Wedge | 257—45 |
| 1,835,323 | 12/1931 | Olsen et al. | 257—254 |
| 2,115,714 | 5/1938 | Houdry | 257—231 |
| 2,379,195 | 6/1945 | Sompson | 257—55 |
| 2,721,806 | 10/1955 | Oberg | 241—23 |
| 2,756,130 | 7/1956 | Bearer | 263—19 |
| 2,759,710 | 8/1956 | Paille | 257—240 |
| 2,824,723 | 2/1958 | Turney. | |
| 2,884,373 | 4/1959 | Bailey | 257—55 |
| 2,946,569 | 7/1960 | Kirkby | 257—55 |

FOREIGN PATENTS 741,843  11/1943  Germany.

ROBERT A. O'LEARY, *Primary Examiner.*
HERBERT L. MARTIN, PERCY L. PATRICK,
*Examiners.*
T. W. STREULE, F. W. LUTER, C. SUKALO,
*Assistant Examiners.*